United States Patent
Kaplan

(10) Patent No.: US 12,305,125 B2
(45) Date of Patent: May 20, 2025

(54) STABILIZED CONCENTRATED FORMALDEHYDE SOLUTIONS AND METHODS OF USE THEREOF

(71) Applicant: BL Technologies, Inc., Minnetonka, MN (US)

(72) Inventor: Gregory Kaplan, Minnetonka, MN (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 619 days.

(21) Appl. No.: 17/619,253

(22) PCT Filed: Jun. 2, 2020

(86) PCT No.: PCT/US2020/035657
§ 371 (c)(1),
(2) Date: Dec. 15, 2021

(87) PCT Pub. No.: WO2020/256920
PCT Pub. Date: Dec. 24, 2020

(65) Prior Publication Data
US 2022/0282166 A1  Sep. 8, 2022

Related U.S. Application Data

(60) Provisional application No. 62/863,497, filed on Jun. 19, 2019.

(51) Int. Cl.
*C10G 29/24* (2006.01)
*B01D 19/00* (2006.01)
(Continued)

(52) U.S. Cl.
CPC ......... *C10G 29/24* (2013.01); *B01D 19/0005* (2013.01); *B01D 53/52* (2013.01); *B01D 53/78* (2013.01); *C02F 1/20* (2013.01); *C02F 1/683* (2013.01); *B01D 2251/21* (2013.01); *C02F 2101/101* (2013.01); *C02F 2101/40* (2013.01);
(Continued)

(58) Field of Classification Search
None
See application file for complete search history.

(56) References Cited

U.S. PATENT DOCUMENTS 4,978,512 A  12/1990  Dillon
7,078,005 B2  7/2006  Smith et al.
(Continued)

FOREIGN PATENT DOCUMENTS

WO  2018001630 A1  1/2018
WO  2018001631 A1  1/2018
(Continued)

OTHER PUBLICATIONS

International Search Report and Written Opinion for International Application No. PCT/US2020/035657, mailed Sep. 16, 2020, 12 pages.
(Continued)

*Primary Examiner* — Daniel Berns
(74) *Attorney, Agent, or Firm* — McCarter & English, LLP

(57) ABSTRACT

A method for preparing a stable concentrated formaldehyde blend, the method providing a formaldehyde solution and a crude glycerol compound; and blending the formaldehyde solution and the crude glycerol compound to obtain a stable concentrated formaldehyde blend.

18 Claims, 1 Drawing Sheet

(51) Int. Cl.
  *B01D 53/52*   (2006.01)
  *B01D 53/78*   (2006.01)
  *C02F 1/20*    (2023.01)
  *C02F 1/68*    (2023.01)
  *C02F 101/10*      (2006.01)
  *C02F 103/10*      (2006.01)

(52) U.S. Cl.
  CPC .. *C02F 2103/10* (2013.01); *C10G 2300/1033* (2013.01); *C10G 2300/1037* (2013.01); *C10G 2300/207* (2013.01)

(56) References Cited

U.S. PATENT DOCUMENTS

| | | |
|---|---|---|
| 2004/0096382 A1 | 5/2004 | Smith et al. |
| 2013/0131387 A1 | 5/2013 | Kaplan et al. |
| 2016/0175769 A1 | 6/2016 | Kamoun et al. |
| 2017/0198225 A1 | 7/2017 | Bailey et al. |

FOREIGN PATENT DOCUMENTS

| | | |
|---|---|---|
| WO | 2018026428 A1 | 2/2018 |
| WO | 2018218641 A1 | 12/2018 |

OTHER PUBLICATIONS

Agbroko et al., A Comprehensive Review of H2S Scavenger Technologies from Oil and Gas Streams. ChemBioEng. 2017;4(6): 339-359.

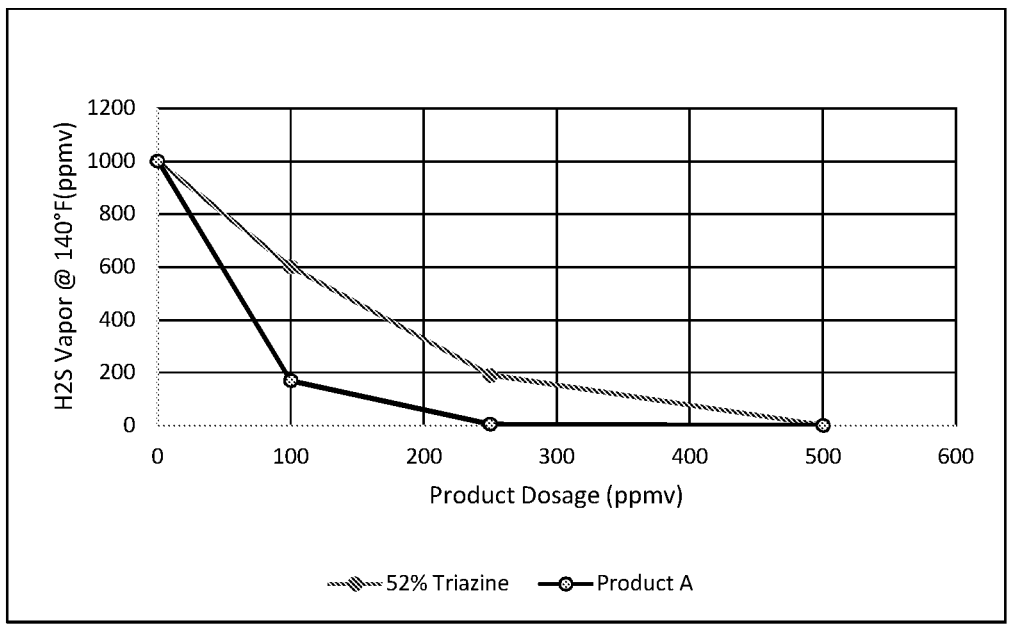

STABILIZED CONCENTRATED FORMALDEHYDE SOLUTIONS AND METHODS OF USE THEREOF

CROSS-REFERENCE TO RELATED APPLICATION

This application is a national phase of International Patent Application No. PCT/US2020/035657 filed Jun. 2, 2020, which claims the priority benefit of U.S. Provisional Patent Application Ser. No. 62/863,497 filed Jun. 19, 2019, the entireties of which is are incorporated by reference.

FIELD OF INVENTION

The disclosed technology provides for a composition and method for providing a concentrated formaldehyde solution, and more specifically, a stabilized concentrated formaldehyde solution obtained using crude glycerol.

BACKGROUND OF THE INVENTION

Rising hydrogen sulfide (H2S) levels in crude found in natural gas require large volumes of low-cost scavengers. Generally, formaldehyde is the cheapest H2S scavenger known. While formaldehyde solution in water (otherwise known as formalin) is inexpensive, it is unstable, resulting in precipitation of solid paraformaldehyde, thus making field applications virtually impossible especially in cold climates.

Methanol has been used to prepare stable formalin. For example, common commercial products provide 37% formalin containing 10-15% methanol. However, the resulting product is highly flammable, which makes it undesirable in upstream and downstream applications. Ethylene glycol has also been used. However, it is expensive and toxic, causing ground waters contamination, and raising concerns about its environmental impact.

With the rapid expansion of the biodiesel industry, the market is flooded with excessive crude glycerol. Recent advances in biodiesel has made crude glycerol cheap and plentiful. However, crude glycerol generated from biodiesel production is impure and of little economic value, and as such, companies struggle to deal with crude glycerol waste streams.

Thus, what is needed in the art is a composition and method for preparing stable formulations of concentrated formaldehyde using crude glycerol that avoid the aforementioned limitations.

SUMMARY OF THE INVENTION

The disclosed technology generally described hereinafter provides for a composition and method for providing a concentrated formaldehyde blend, and more specifically, a stabilized concentrated formaldehyde blend obtained using crude glycerol.

In one aspect of the disclosed technology, a concentrated formaldehyde blend is provided. The blend comprises a formaldehyde solution; and a crude glycerol compound.

In some embodiments, the formaldehyde solution comprises about 30-55% active formaldehyde in solution. In some embodiments, the crude glycerol comprises about 80-85% glycerol by weight. In some embodiments, the ratio of formaldehyde to crude glycerol is from about 1:10 to about 10:1. In some embodiments, the ratio of formaldehyde to crude glycerol is from about 4:1 to about 5:1. In some embodiments, the concentrated formaldehyde blend is stable.

In yet another aspect of the disclosed technology, a concentrated formaldehyde blend is provided. The blend comprises a formaldehyde solution; and a glycerol compound. In some embodiments, the formaldehyde solution comprises about 30-55% active formaldehyde in solution. In some embodiments, the glycerol compound comprises at least 80% glycerol by weight. In some embodiments, the ratio of formaldehyde to glycerol is from about 4:1 to about 5:1. In some embodiments, the concentrated formaldehyde blend is stable.

In yet another aspect of the disclosed technology, a method for preparing a stable concentrated formaldehyde blend is provided. The method comprises providing a formaldehyde solution and a crude glycerol compound; and blending the formaldehyde solution and the crude glycerol compound to obtain a stable concentrated formaldehyde blend.

In some embodiments, the formaldehyde solution comprises about 20-60% active formaldehyde in solution. In some embodiments, the formaldehyde solution comprises about 30-55% active formaldehyde in solution. In some embodiments, the crude glycerol comprises about 10-90% glycerol by weight. In some embodiments, the ratio of formaldehyde to crude glycerol is from about 1:10 to about 10:1. In some embodiments, the pH of the blend is adjusted with an acid and/or a base. In some embodiments, the step of blending is performed at a temperature range of about 20° C. to 90° C. In some embodiments, the temperature is about 50-60° C. In some embodiments, the stable concentrated formaldehyde blend is further used in conjunction with a plurality of amines, triazines, glyoxal compounds, and/or surfactants.

In yet another aspect of the disclosed technology, a method for preparing a stable concentrated formaldehyde blend is provided. The method comprises providing a formaldehyde solution and a glycerol compound; and blending the formaldehyde solution and the glycerol compound to obtain a stable concentrated formaldehyde blend.

In some embodiments, the formaldehyde solution comprises about 20-60% active formaldehyde in solution. In some embodiments, the formaldehyde solution comprises about 30-55% active formaldehyde in solution. In some embodiments, the glycerol compound comprises at least 80% glycerol by weight. In some embodiments, the ratio of formaldehyde to glycerol is from about 1:10 to about 10:1. In some embodiments, the pH of the blend is adjusted with an acid and/or a base. In some embodiments, the step of blending is performed at a temperature range of about 20° C. to 90° C. In some embodiments, the temperature is about 50-60° C. In some embodiments, the stable concentrated formaldehyde blend is further used in conjunction with a plurality of amines, triazines, glyoxal compounds, and/or surfactants.

In yet another aspect of the disclosed technology, a method of scavenging is provided. The method comprises preparing a concentrated formaldehyde formulation; and delivering the concentrated formaldehyde formulation to a fluid stream.

In some embodiments, the method of scavenging comprises hydrogen sulfide scavenging, mercaptan scavenging, and/or carbonyl sulfide scavenging. In some embodiments, the concentrated formaldehyde formulation is stable. In some embodiments, the concentrated formaldehyde formulation is a blend. In some embodiments, preparing the concentrated formaldehyde formulation comprises blending a formaldehyde solution and a glycerol compound. In some embodiments, the glycerol compound is crude glycerol.

In some embodiments, the concentrated formaldehyde formulation comprises about 30-55% active formaldehyde in solution, and about 80-85% glycerol by weight. In some embodiments, the concentrated formaldehyde formulation comprises about 50-52% active formaldehyde in solution, and about 80-85% glycerol by weight. In some embodiments, the fluid stream comprises a refinery stream, an oilfield stream, a reservoir, a hydrocarbon stream, or an aqueous stream. In some embodiments, from about 1 ppm to about 100,000 ppm of the concentrated formaldehyde formulation is provided to the fluid stream.

BRIEF DESCRIPTION OF SEVERAL VIEWS OF THE DRAWINGS

These and other features of the disclosed technology, and the advantages, are illustrated specifically in embodiments now to be described, by way of example, with reference to the accompanying diagrammatic drawings, in which:

FIG. 1 is a graph providing results of an illustrative embodiment of the disclosed technology.

DETAILED DESCRIPTION OF EXEMPLARY EMBODIMENTS

The disclosed technology provides for a composition and method for providing a concentrated formaldehyde blend, and more specifically, a stabilized concentrated formaldehyde blend obtained using crude glycerol.

It was surprisingly discovered that crude, biodiesel waste-derived glycerol (referred to herein as "crude glycerol") provided an excellent stabilizing effect on non-stabilized, concentrated formaldehyde solutions in water. The stable concentrated formaldehyde solutions obtained using crude glycerol were effective in hydrogen sulfide scavenging applications, yet were not flammable, provided excellent cold handling properties, and low cost performance, as compared to other conventional formaldehyde-based scavengers (such as triazines). Additionally, the stable concentrated formaldehyde blends as disclosed herein provide lower environmental impact and were found to minimize or eliminate downstream problems, such as, for example, the creation of "tramp" amines, or toxic ethylene glycol, or flammable methanol as by-products of H2S scavenging.

The disclosed technology provides for a stable concentrated formaldehyde blend. The blend comprises a formaldehyde solution, and a crude glycerol compound. The concentrated formaldehyde blend is stabilized by the crude glycerol, where the crude glycerol prevents formaldehyde polymerization and/or the formation of insoluble paraformaldehyde.

It should be understood that the formaldehyde present in solution is unstabilized (i.e. non-stabilized) formaldehyde. In some embodiments, the formaldehyde solution comprises about 20-60% active formaldehyde in solution. In other embodiments, the formaldehyde solution comprises about 30-55% active formaldehyde in solution, and in other embodiments, the formaldehyde solution comprises about 50-52% active formaldehyde in solution. In other embodiments, the formaldehyde solution comprises at least 10% active formaldehyde in solution. In some embodiments, paraformaldehyde can also be used as a source of soluble formaldehyde.

The crude glycerol as described herein is crude, biodiesel (or other natural oil or fats processing) waste-derived glycerol. It should be understood that the crude glycerol compound is obtained from and is the by-product of most any conventional biodiesel manufacturing processes, or other natural oil or fats processing. In some embodiments, the crude glycerol comprises at least 80% glycerol by weight. In some embodiments, the crude glycerol comprises about 80-85% glycerol by weight. In other embodiments, the crude glycerol comprises at least 10% glycerol by weight.

It should be understood that glycerol that is purer than crude glycerol may also be used to obtain the concentrated formaldehyde blends as disclosed herein. In some embodiments, glycerol comprises at least 80% glycerol by weight. In other embodiments, glycerol comprises about 80-99% glycerol by weight. In other embodiments, glycerol comprises at least 99% glycerol by weight. When used at low levels, such pure glycerol and formaldehyde blends, as described herein, provide manufacturing costs that are still significantly reduced.

In some embodiments, the blend provides for a ratio of formaldehyde to crude glycerol that is from about 1:10 to about 10:1. In other embodiments, the ratio of formaldehyde to crude glycerol is from about 4:1 to about 5:1.

The stable concentrated formaldehyde blend provides a low viscosity. In some embodiments, the stable concentrated formaldehyde blend has a viscosity of less than about 30 cPs. In some embodiments, the stable concentrated formaldehyde blend has a viscosity of less than about 15 cPs. In some embodiments, the stable concentrated formaldehyde blend has a viscosity from about 10-15 cPs at room temperature. In some embodiments, the stable concentrated formaldehyde blend has a viscosity from about 25-30 cPs at 4° C. In some embodiments, the stable concentrated formaldehyde blend remained a low viscosity liquid at 0° F. (−18° C.).

A method for preparing a stable concentrated formaldehyde blend is further provided. The method comprises providing a formaldehyde solution and a crude glycerol compound, and blending the formaldehyde solution and the crude glycerol compound to obtain a stable concentrated formaldehyde blend.

In some embodiments, the method provides a formaldehyde solution comprising about 20-60% active formaldehyde in solution. In other embodiments, the method provides a formaldehyde solution comprising about 30-55% active formaldehyde in solution, and in other embodiments, a formaldehyde solution comprising about 50-52% active formaldehyde in solution. In some embodiments, the method provide a crude glycerol compound comprises at least 80% glycerol by weight, and in other embodiments, about 80-85% glycerol by weight. In some embodiments, the ratio of formaldehyde to crude glycerol is from about 1:10 to about 10:1.

The method comprises blending the formaldehyde solution and the crude glycerol compound to obtain the stable concentrated formaldehyde blend. The step of blending may be provided by any conventional blending techniques sufficient for the purposes described herein. For example, in some embodiments, blending may be conducted in blending tanks, reactors, inline mixers, tail cars or tanker trucks, or the like. By simply blending the formaldehyde solution and the crude glycerol together, production and manufacturing costs are significantly reduced, and the resulting blends/formulations have lower environmental impact as compare to triazines, methanol, or ethylene glycol based formulations.

Generally, when glycerol reacts with formaldehyde it forms dioxolane-type materials. These dioxolane-type materials do not react with H2S (thus decreasing overall scavenging efficacy) and are also extremely flammable. Additionally, oligomeric or polymeric-type products are formed during the reaction of glycerol and formaldehyde, further reducing activity and increasing viscosity, which are detrimental to scavenging applications. Therefore, as in the present disclosure, during blending, any reaction between the glycerol and the formaldehyde is actively suppressed. It is believed that crude glycerol caps formaldehyde chains present in order to prevent the formation of insoluble paraformaldehyde.

In some embodiments, during blending, the reaction is suppressed by reducing the temperature at which such blends/formulations are prepared. In some embodiments, during blending, the reaction is suppressed due to the absence of a catalyst. By actively suppressing such reaction, when blended together, a larger amount of active formaldehyde will remain in the final product, which in turn provides for a higher hydrogen sulfide scavenging activity/efficiency as compared with other conventional formaldehyde-based scavengers.

The concentrated formaldehyde blend as described herein is stable. It is believed that such stability of the concentrated formaldehyde blend is obtained due to the low temperature at which such blends are prepared. In some embodiments, the step of blending is performed at a temperature range of about 30-90° C. In other embodiments, the step of blending is performed at a temperature range of about 50-60° C.

The stable concentrated formaldehyde blend is also non-flammable. In some embodiments, these non-flammable blends are desirable in upstream and downstream applications such as, but not limited to, crude oil or natural gas formations and reservoirs, pipelines, tankers, refinery streams, natural gas streams, other hydrocarbon recycling and recovery streams, aqueous streams and/or a combination thereof.

In some embodiments, the concentrated formaldehyde blends are prepared in the absence of methanol. In other embodiments, the concentrated formaldehyde blends are prepared in solutions that comprise less than 2% residual methanol. In some embodiments, the stable concentrated formaldehyde blend provides a flash point of greater than 85° C. (185° F.).

In some embodiments, the stable concentrated formaldehyde blend is further used in conjunction with a plurality of amines, triazines, glyoxal compounds, and/or surfactants. In some embodiments, method for preparing a stable concentrated formaldehyde blend may further comprise the use of an acid or a base to adjust the pH to a desired level. In some embodiments, the acid comprises an organic acid, a mineral acid, or $H_2SO_4$. In some embodiments, the acid is acetic acid. In some embodiments, the base comprises an alkali metal hydroxide, or an amine. In some embodiments, the alkali metal hydroxide comprises NaOH or KOH. In some embodiments, the amine comprises monoethanolamine (MEA), methylamine (MA), and/or triethanolamine (TEA).

In yet another aspect of the disclosed technology, a method of scavenging is provided. The method comprises preparing a concentrated formaldehyde formulation, and delivering the concentrated formaldehyde formulation to a fluid stream.

In some embodiments, the method of scavenging comprises hydrogen sulfide scavenging, carbonyl sulfide (COS) scavenging, and/or mercaptan scavenging. In some embodiments, the concentrated formaldehyde blends as described herein are applied to the delivery of hydrogen sulfide scavengers to oil or natural gas production operations such as, but not limited to, oilfield formations, wells, crude oil conveyance systems (pipeline, tankers etc.), and/or refinery operations. In some embodiments, the concentrated formaldehyde blends are used in industrial systems where H2S or other sulfides are problematic, and to industrial or municipal wastewater treatment systems/applications.

The method of scavenging provides for a concentrated formaldehyde formulation that is a stable blend. The method of scavenging provides for preparing the concentrated formaldehyde formulation by blending a formaldehyde solution and a crude glycerol compound. In some embodiments, the concentrated formaldehyde formulation comprises about 30-55% active formaldehyde in solution, and about 80-85% glycerol by weight. In other embodiments, the concentrated formaldehyde formulation comprises about 50-52% active formaldehyde in solution, and about 80-85% glycerol by weight.

It was surprisingly discovered that the stable concentrated formaldehyde blends as described herein provide approximately 40% higher hydrogen sulfide scavenging ability as compared to benchmark 52% triazine. As shown in FIG. 1, the stable concentrated formaldehyde blend (i.e. Product A) provided an increase in scavenging ability at a lower dose. Because a larger practical concentration of formaldehyde is present in the disclosed blends, and since H2S scavenging ability is proportional to the concentration of active formaldehyde, the result is a blend having a higher hydrogen sulfide scavenging activity as compared with other conventional formaldehyde-based scavengers. With higher scavenging activity, treatment, shipping, and storage costs can be reduced with the use of the disclosed blends.

The method of scavenging further provides for delivering the concentrated formaldehyde formulation to a fluid stream. In some embodiments, the fluid stream comprises a refinery stream, an oilfield stream or reservoir, or a hydrocarbon stream. In other embodiments, the fluid stream may be present in, but not limited to, oilfield wells, industrial water cooling systems, and/or hydrocarbon streams.

The concentrated formaldehyde formulation is delivered to a fluid stream by any conventional technique sufficient for the purposes described herein. In some embodiments, about 100 ppm to about 1000 ppm of the concentrated formaldehyde formulation is provided to the fluid stream. In other embodiments, from about 1 ppm to about 100,000 ppm of the concentrated formaldehyde formulation is provided to the fluid stream.

EXAMPLES

The present invention will be further described in the following examples, which should be viewed as being illustrative and should not be construed to narrow the scope of the disclosed technology or limit the scope to any particular embodiments.

A stable concentrated solution of formaldehyde (Product A in FIG. 1) was prepared. 100 gm of 50% formaldehyde solution was mixed with 40 gm of crude glycerol. The formaldehyde solution and the crude glycerol were mixed in a blending tank at 50-60° C. for 10 minutes, resulting in Product A.

The stable concentrated formaldehyde blend provided a flash point of greater than 185° F. (85° C.), a viscosity of about (i) 10-15 cPs at room temperature, (ii) 25-30 cPs at 4° C., and (iii) remained a low viscosity liquid at 0° F. (−18° C.). The stable concentrated formaldehyde blends were determined to maintain a low viscosity at temperatures below 0° F. Product A may freeze as the temperature approaches extremely low temperatures around approximately <−40° C. However, Product A will thaw above these extremely low temperatures to revert to clear low viscosity liquid. (It should be noted that, if necessary, in some applications, common techniques such as the addition of small amounts of methanol could keep Product A in liquid form at such low temperatures.)

While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A stable concentrated formaldehyde blend, the blend comprising:
   a formaldehyde solution; and
   a glycerol compound,
   wherein the glycerol compound is crude glycerol, and the crude glycerol comprises about 80-85% glycerol by weight.

2. The blend as recited in claim 1, wherein the ratio of formaldehyde to crude glycerol is from about 1:10 to about 10:1.

3. The blend as recited in claim 1, wherein the formaldehyde solution comprises about 30-55% active formaldehyde in solution.

4. The blend as recited in claim 1, wherein the ratio of formaldehyde to glycerol is from about 4:1 to about 5:1.

5. A method for preparing a stable concentrated formaldehyde blend, the method comprising:
   providing a formaldehyde solution and a glycerol compound; and
   blending the formaldehyde solution and the glycerol compound to obtain a stable concentrated formaldehyde blend,
   wherein the glycerol compound is crude glycerol, and the crude glycerol comprises about 80-85% glycerol by weight.

6. The method as recited in claim 5, wherein the ratio of formaldehyde to crude glycerol is from about 1:10 to about 10:1.

7. The method as recited in claim 5, wherein the formaldehyde solution comprises about 30-55% active formaldehyde in solution.

8. The method as recited in claim 5, wherein the step of blending is performed at a temperature range of about 20° C. to 90° C.

9. The method as recited in claim 5, wherein the stable concentrated formaldehyde blend is further used in conjunction with a plurality of amines, triazines, glyoxal compounds, and/or surfactants.

10. A method of scavenging, the method comprising:
    preparing a stable concentrated formaldehyde blend as recited in claim 1; and
    delivering the concentrated formaldehyde blend to a fluid stream.

11. The method as recited in claim 10, wherein said method of scavenging comprises hydrogen sulfide scavenging, mercaptan scavenging, and/or carbonyl sulfide scavenging.

12. The method as recited in claim 10, wherein the fluid stream comprises a refinery stream, an oilfield stream, a reservoir, a hydrocarbon stream, or an aqueous stream, and wherein from about 1 ppm to about 100,000 ppm of the stable concentrated formaldehyde blend is provided to the fluid stream.

13. The method as recited in claim 10, wherein preparing the stable concentrated formaldehyde blend comprises blending the formaldehyde solution and the glycerol compound.

14. The method as recited in claim 13, wherein the stable concentrated formaldehyde blend comprises about 30-55% active formaldehyde in solution.

15. A stable concentrated formaldehyde blend, the blend comprising:
    a formaldehyde solution; and
    a glycerol compound,
    wherein the glycerol compound comprises at least 80% glycerol by weigh.

16. The blend as recited in claim 15, wherein the formaldehyde solution comprises about 30-55% active formaldehyde in solution.

17. The blend as recited in claim 15, wherein the ratio of formaldehyde to glycerol is from about 1:10 to about 10:1.

18. The blend as recited in claim 15, wherein the ratio of formaldehyde to glycerol is from about 4:1 to about 5:1.

* * * * *